3,141,885
2-ALKYLMERCAPTOAMINO-4-ALKYLAMINO-
1,3,5-TRIAZINES
Frank Ross, Villa Park, and Sidney B. Richter, Chicago, Ill., assignors to Velsicol Chemical Corporation, Chicago, Ill., a corporation of Illinois
No Drawing. Filed Jan. 26, 1962, Ser. No. 169,134
8 Claims. (Cl. 260—249.8)

This invention relates to new herbicidal compositions of matter. More specifically, this invention relates to compounds having the following structural formula

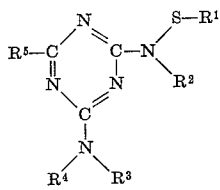

wherein $R^1$ is an alkyl radical of 1 to 4 carbon atoms; $R^2$ and $R^3$ are independently selected from the group consisting of hydrogen and alkyl radicals of 1 to 6 carbon atoms; $R^4$ is an alkyl radical of 1 to 6 carbon atoms; and $R^5$ is selected from the group consisting of chlorine, bromine, methoxy, methylmercapto and

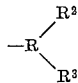

wherein $R^2$ and $R^3$ are as defined above.

These chemical compounds have marked activity as herbicides useful for the control of undesirable plant life. The new compounds have improved water solubility.

The new compounds described above can be prepared, for example, by successively partially or completely replacing the halide atoms of the corresponding cyanuric halide, with desired substituents. Cyanuric halides which are suitable as the starting material for the preparation of the compounds of this invention, are cyanuric chloride and cyanuric bromide. Thus, the chlorine atoms of cyanuric chloride and the bromide atoms of cyanuric bromide are successively replaced with desired substituents.

If two of the halide atoms of the cyanuric halide are replaced, the compound will be the corresponding 2,4-disubstituted-6-monohalo-1,3,5-triazine compound of the present invention. If all three halide atoms are replaced the compound is the 2,4,6-trisubstituted-1,3,5-triazine.

The successive substitution of the halide atoms of the cyanuric halide with the negative groups defined above as $-N(R^2)SR^1$, $-N(R^3)R^4$, and $-R^5$ wherein $R^5$ may be methoxy, methylmercapto, or $-N(R^2)R^3$ and $R^1-R^5$ are as previously defined, above, can be effected by reacting the cyanuric halide with $R^2NHSR^1$, $R^3NHR^4$, and $HR^5$ wherein $R^5$ is as herein described, respectively. Thus, the 2-position halide atoms of the suitable cyanuric halide can be replaced with

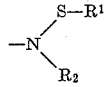

by reacting the cyanuric halide with $R^2NHSR$, wherein $R^1$ and $R^2$ are as defined above, and the 4-position halide atom can be thereafter replaced with a monoalkyl- or dialkylamino radical by reacting the product of the previous step with a suitable monoalkyl- or dialkylamine, to form the compounds of the present invention wherein $R^5$ is a halide. The compounds of the present invention wherein $R^5$ is methoxy, methylmercapto or

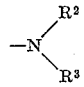

can be prepared by reacting the corresponding 2,4-disubstituted-6-halo-1,3,5-triazine with methanol, methyl mercaptan, ammonia, alkylamine or dialkylamine, as desired. Alternatively the cyanuric halide can be reacted first with $R^3NHR^4$ or $HR^5$ and successively with the remaining substituents in either order.

More specifically, the compounds of the present invention having the above described structural formula, wherein $R^5$ is chlorine, can be readily prepared in a two-step synthesis. The first step comprises reacting cyanuric chloride with an equimolecular or greater quantity of an alkylmercaptoamine or an N-alkylmercapto-N-alkylamine at a low temperature, in order to replace only one chlorine atom of the cyanuric chloride. Temperatures in the range of $-20°$ C. to $20°$ C. have been found to be suitable for this reaction. The cyanuric chloride is preferably dissolved in an inert organic solvent, such as dioxane, and the solution mixed with water to obtain a finely dispersed mixture. The amine is added to the cyanuric chloride mixture with stirring. Thereafter an alkali metal hydroxide, such as sodium hydroxide, or an excess quantity of the amine reactant, is added to the reaction mixture to neutralize the hydrogen chloride formed by the reaction. Upon agitation of the mixture for up to several hours, the crude 2-alkylmercapto- (or alkylmercaptoalkyl)amino - 4,6 - dichloro-1,3,5 - triazine intermediate precipitates from the reaction mixture. The crude intermediate can be used in the next step of the procedure as such, or preferably, can be purified by one or more crystallizations from a suitable solvent.

Suitable amines of the type $R^2NHSR^1$ have been disclosed in United States Patent 2,877,749, granted March 17, 1959, and can be prepared, for example, by treating a sulfenyl halide with an equimolar amount of an amine in the presence of an equimolar amount of aqueous NaOH as shown in United States Patent 2,520,400, granted August 29, 1950.

In the second step, the product of the first step is reacted with an equimolecular or greater quantity of mono- or dialkylamine. The intermediate is preferably dissolved in an inert organic solvent, such as dioxane, and is mixed with cold water. Mono- or dialkylamine, preferably dissolved in water, is slowly added to the intermediate. An alkali metal hydroxide, or an excess of the amine if it acts as a strong base, is added to the reaction mixture to neutralize hydrogen chloride as it forms. The mixture is heated at between about $30°$ C. and about $60°$ C. with agitation. The precipitate formed is the crude 2 - alkylmercapto-(or alkylmercaptoalkyl)amino-4-mono-(or di)alkylamino-6-chloro-1,3,5-triazine product of the present invention. The crude product can be used as such, or preferably, can be recrystallized from a suitable solvent to yield the relatively pure compound.

In a similar manner compounds of the present invention having the above described structural formula wherein $R^5$ is bromine can be prepared by substituting cyanuric bromide for cyanuric chloride in the above procedure.

To prepare the compounds of the present invention having the previously described structural formula wherein $R^5$ is methoxy, methylmercapto, or

wherein $R^2$ and $R^3$ are as heretofore described, the disubstituted halo-1,3,5-triazine prepared above is reacted with methyl alcohol, methyl mercaptan, or a suitable amine, respectively. The amines having the formula

and which are suitable for reaction with disubstituted halo-1,3,5-triazine, are exemplified by: ammonia, methylamine, ethylamine, n-propylamine, isopropylamine, n-butylamine, iso-butylamine, sec-butylamine, tert-butylamine, N,N-dimethylamine, N-methyl-N-ethylamine, N,N-diethylamine, N-methyl-N-n-propylamine, N-ethyl-N-n-propylamine, and the like.

The reaction of the disubstituted halo-1,3,5-triazine with an equimolecular or greater quantity of methyl alcohol, methyl mercaptan, ammonia and the lower alkyl- and dialkylamines can be effected at reaction temperatures in the order of 70–120° C. Since methyl alcohol, methyl mercaptan, ammonia and the lower alkyl and dialkylamines are generally vapors in this temperature range, it is convenient to utilize superatmospheric pressure and/or aqueous solutions of these reactants. An alkali metal hydroxide is used in this reaction in same manner as previously described, to neutralize the hydrogen chloride formed by the reaction or to form an alkali metal methoxide or the salt of methyl mercaptan in situ, as required. The crude product formed by the reaction can often be used as such, or can be recrystallized from a suitable solvent to yield the relatively pure compound.

Thus, the compounds of the present invention having the previously described structural formula wherein $R^5$ is chlorine, and which are prepared by the procedure described above, are exemplified by:

2-methylmercaptoamino-4-methylamino-6-chloro-1,3,5-triazine,
2-(N-methylmercapto-N-methylamino)-4-methylamino-6-chloro-1,3,5-triazine,
2-methylmercaptoamino-4-(N,N-dimethylamino)-6-chloro-1,3,5-triazine,
2-(N-methylmercapto-N-methylamino)-4-(N,N-dimethylamino)-6-chloro-1,3,5-triazine,
2-methylmercaptoamino-4-ethylamino-6-chloro-1,3,5-triazine,
2-ethylmercaptoamino-4-ethylamino-6-chloro-1,3,5-triazine,
2-ethylmercaptoamino-4-(N,N-dimethylamino)-6-chloro-1,3,5-triazine,
2-(N-ethylmercapto-N-methylamino)-4-methylamino-6-chloro-1,3,5-triazine,
2-(N-ethylmercapto-N-ethylamino)-4-(N,N-dimethylamino)-6-chloro-1,3,5-triazine, and
2-(N-methylmercapto-N-methylamino)-4-(N,N-di-n-propylamino)-6-chloro-1,3,5-triazine.

Similarly, the compounds of the present invention having the structural formula previously described, wherein $R^5$ is bromine, include:

2-(N-methylmercapto-N-methylamino)-4-(N,N-dimethylamino)-6-bromo-1,3,5-triazine,
2-(N-methylmercapto-N-methylamino)-4-ethylamino-6-bromo-1,3,5-triazine,
2-(N-methylmercapto-N-methylamino)-4-isopropylamino-6-bromo-1,3,5-triazine,
2-(N-ethylmercapto-N-ethylamino)-4-(N,N-dimethylamino)-6-bromo-1,3,5-triazine, and
2-(N-ethylmercapto-N-methylamino)-4-(N,N-dimethylamino-6-bromo-1,3,5-triazine.

Exemplary of the compounds of this invention having the previously described structural formula, wherein $R^5$ is methoxy, are:

2-(N-methylmercapto-N-methylamino)-4-(N,N-dimethylamino)-6-methoxy-1,3,5-triazine,
2-(N-methylmercapto-N-methylamino)-4-ethylamino-6-methoxy-1,3,5-triazine,
2-(N-ethylmercapto-N-methylamino)-4-(N,N-dimethylamino)-6-methoxy-1,3,5-triazine, and
2-(N-methylmercapto-N-methylamino)-4-(N,N-di-n-propylamino)-6-methoxy-1,3,5-triazine.

Included among the compounds of the present invention represented by the previously described structural formula, wherein $R^5$ is methylmercapto, are:

2-methylmercaptoamino-4-methylamino-6-methylmercapto-1,3,5-triazine,
2-(N-methylmercapto-N-methylamino)-4-ethylamino-6-methylmercapto-1,3,5-triazine,
2-(N-methylmercapto-N-methylamino)-4-isopropylamino-6-methylmercapto-1,3,5-triazine,
2-isopropylmercaptoamino-4-(N,N-dimethylamino)-6-methylmercapto-1,3,5-triazine, and
2-(N-methylmercapto-N-methylamino)-4-(N,N-di-n-propylamino)-6-methylmercapto-1,3,5-triazine.

The compounds of the present invention having the previously described structural formula, wherein $R^5$ is

wherein $R^2$ and $R^3$ are as previously described, are exemplified by:

2-methylmercaptoamino-4-methylamino-6-amino-1,3,5-triazine,
2-(N-methylmercapto-N-methylamino)-4-(N,N-dimethylamino)-6-amino-1,3,5-triazine,
2-ethylmercaptoamino-4-(N,N-dimethylamino)-6-amino-1,3,5-triazine,
2-isopropylmercaptoamino-4-(N,N-dimethylamino)-6-amino-1,3,5-triazine,
2-(N-methylmercapto-N-methylamino)-4-(N,N-dimethylamino)-6-methylamino-1,3,5-triazine,
2-(N-ethylmercapto-N-ethylamino)-4-methylamino-6-N,N-diethylamino)-1,3,5-triazine, and
2-(N-ethylmercapto-N-ethylamino)-4,6-di-(N,N-di-n-propylamino)-1,3,5-triazine.

The manner in which the new compounds of this invention can be prepared is illustrated in the following examples.

EXAMPLE 1

*Preparation of 2-(N-Methylmercapto-N-Methylamino)-4,6-Dichloro-1,3,5-Triazine*

A solution of cyanuric chloride (18.5 g.; 0.1 mol) in warm dioxane (70 ml.) is added to crushed ice (203.5 g.) and water (50 ml.) with vigorous stirring in a one-liter, three-necked, round-bottom flask equipped with stirrer, thermometer, and dropping funnel. The flask is placed in an ice-water bath to provide cooling. After the cyanuric chloride solution has been added, a solution of N-methylmercapto-N-methylamine (8 g.; 0.1 mol) in cold dioxane is added with stirring. A solution of sodium hydroxide (8 g.; 0.2 mol) in water (100 ml.) is next added dropwise into the flask over a period of about 25 minutes. The reaction mixture is stirred for about two hours while its temperature is allowed to rise to about 15° C. The mixture is extracted with diethyl ether. The ether solution is dried and the solvent evaporated to yield 2 - (N - methylmercapto - N - methylamino)-4,6-dichloro-1,3,5-triazine.

EXAMPLE 2

*Preparation of 2-(N-Methylmercapto-N-Methylamino)-4-Ethylamino-6-Chloro-1,3,5-Triazine*

2-(N-methylmercapto - N - methylamino)4,6-dichloro-1,3,5-triazine (0.07 mol), prepared in Example 1, is dissolved in warm dioxane, and the solution therefrom filtered into cold water (200 ml.). A solution (100 ml.) of 70% ethylamine (4.9 g.) in water is added dropwise over a period of 20 minutes, at a temperature of 25–30° C., followed by the addition of a solution of sodium hydroxide (2.9 g.) in water (100 ml.) over a period of 15 minutes. The reaction mixture is then heated at 40° C. for two hours. The mixture is extracted with diethyl ether. The ether solution is dried and the solvent evaporated to yield 2-(N-methylmercapto-N-methylamino)-4-ethylamino-6-chloro-1,3,5-triazine.

EXAMPLE 3

*Preparation of 2-(N-Methylmercapto-N-Methylamino)-4-Isopropylamino-6-Chloro-1,3,5-Triazine*

Into a one-liter, three-necked, round-bottom flask fitted with a mechanical stirrer, thermometer, and dropping funnel, is placed cold water (200 ml.). Crude 2-(N-methylmercapto - N - methylamino)4,6-dichloro-1,3,5-triazine (0.07 mol), prepared as described in Example 1, dissolved in dioxane is filtered into the flask, with vigorous stirring. A solution of isopropylamine (41 g.) in water (100 ml.) is added to the flask over a period of 15 minutes. A second solution of sodium hydroxide (2.8 g.) in water (100 ml.) is added to the flask over a period of 15 minutes. The reaction mixture is heated at 40–45° C. for two hours. The mixture is extracted with diethyl ether. The ether solution is dried and the solvent evaporated to yield 2-(N-methylmercapto-N-methylamino)-4-isopropylamino-6-chloro-1,3,5-triazine.

EXAMPLE 4

*Preparation of 2-(N-Methylmercapto-N-Methylamino)-4-(N,N-Diethylamino)-6-Chloro-1,3,5-Triazine*

Into a one-liter, three-necked, round-bottom flask fitted with a mechanical stirrer, thermometer, and dropping funnel, is placed cold water (200 ml.). Crude 2-(N-methylmercapto-N-methylamino) - 4,6 - dichloro - 1,3,5-triazine (0.07 mol), prepared as described in Example 1, dissolved in dioxane (50 ml.) is filtered into the flask with vigorous stirring. A solution of diethylamine (5.1 g.) in water (100 ml.) is added to the flask over a period of 15 minutes. A second solution of sodium hydroxide (2.6 g.) in water (100 ml.) is also added to the flask over a period of 15 minutes. The reaction mixture is heated at 35–45° C. for two hours with stirring, poured over crushed ice (1000 g.) and extracted with diethyl ether. The ether solution is dried with anhydrous magnesium sulfate, filtered, and the diethyl ether evaporated therefrom to yield 2-(N-methylmercapto - N - methylamino)-4-(N,N-diethylamino)-6-chloro-1,3,5-triazine.

Other compounds within the scope of the present invention having the aforesaid structural formula, wherein $R^5$ is chlorine or bromine can be prepared in the manner detailed in the previous examples. Given in Examples 5–27 are the amine reactants which can be used with cyanuric chloride and cyanuric bromide (designated for brevity as CC and CB, respectively) to prepare the indicated named compounds of this invention:

EXAMPLE 5

CC + Ethylmercaptoamine + Methylamine=2-Ethylmercaptoamino-4-methylamino-6-chloro-1,3,5-triazine.

EXAMPLE 6

CC + N-Ethylmercapto-N-ethylamine + Ethylamine= 2-(N-Ethylmercapto - N - ethylamino) - 4 - ethylamino-6-chloro-1,3,5-triazine.

EXAMPLE 7

CC + N-Methylmercapto-N-methylamine + n-Butylamine = 2-(N-Methylmercapto - N - methylamino)-4-n-butylamino-6-chloro-1,3,5-triazine.

EXAMPLE 8

CC + Isopropylmercaptoamine + N,N-Dimethylamine =2-Isopropylmercaptoamino - 4 - (N,N-dimethylamino)-6-chloro-1,3,5-triazine.

EXAMPLE 9

CC + n-Proplymercaptoamine + N,N-Dimethylamine = 2 - n-Propylmercaptoamino-4-(N,N-dimethylamino)-6-chloro-1,3,5-triazine.

EXAMPLE 10

CC+n-Butylmercaptoamine + N,N-Dimethylamine= 2 - n - Butylmercaptoamino - 4 - (N,N-dimethylamino)-6-chloro-1,3,5-triazine.

EXAMPLE 11

CC+Methylmercaptoamine + Ethylamine=2-Methylmercaptoamino - 4 -ethylamino - 6 - chloro-1,3,5-triazine.

EXAMPLE 12

CC+Methylmercaptoamine + N,N - Diethylamine=2-Methylmercaptoamino - 4-(N,N-diethylamino)-6-chloro-1,3,5-triazine.

EXAMPLE 13

CC + Methylmercaptoamine + Isopropylamine=2 - Methylmercaptoamino - 4 - isopropylamino - 6 - chloro-1,3,5-triazine.

EXAMPLE 14

CC+N-Methylmercapto - N -ethylamine+Ethylamine =2 - (N,Methylmercapto - N - ethylamino) - 4 -ethylamino - 6 - chloro - 1,3,5-triazine.

EXAMPLE 15

CC+N-Methylmercapto-N-ethylamine + N,N-Diethylamine=2 - (N - Methylmercapto - N - ethylamino) - 4 - (N,N-diethylamino)-6-chloro-1,3,5-triazine.

EXAMPLE 16

CC+N - Methylmercapto - N - ethylamine+Isopropylamine=2 - (N-Methylmercapto - N-ethylamino) - 4 - isopropylamino-6-chloro-1,3,5-triazine.

EXAMPLE 17

CC + Ethylmercaptoamine + Ethylamine = 2-Ethylmercaptoamino - 4 -ethylamino - 6 - chloro - 1,3,5 - triazine.

EXAMPLE 18

CC + Ethylmercaptoamine + N,N-Diethylamine=2-Ethylmercaptoamino - 4 - (N,N - diethylamino)-6-chloro-1,3,5-triazine.

EXAMPLE 19

CC + Ethylmercaptoamine + Isopropylamine = 2 - Ethylmercaptoamino - 4 - isopropylamino - 6 - chloro - 1,3,5-triazine.

EXAMPLE 20

CC + N-Ethylmercapto - N - ethylamine + Isopropylamine = 2-(N-Ethylmercapto-N-ethylamino)-4-isopropylamino-6-chloro-1,3,5,-triazine.

EXAMPLE 21

CC + N-Ethylmercapto-N-ethylamine + N,N-Diethylamine=2 - (N - Ethylmercapto - N - ethylamino) - 4 - (N,N-diethylamino)-6-chloro-1,3,5-triazine.

EXAMPLE 22

CC + N-Methylmercapto-N-methylamine + N,N-din - propylamine = 2 - (N-Methylmercapto - N - methylamino) - 4 - (N,N - di - n - propylamino) - 6 - chloro - 1,3,5-triazine.

EXAMPLE 23

CB + Methylmercaptoamine + methylamine = 2-Methylmercaptoamino - 4 - methylamino - 6 - bromo - 1,3,5-triazine.

EXAMPLE 24

CB + N-Methylmercapto - N - methylamine + methylamine = 2 - (N - Methylmercapto - N - methylamino) - 4 - methylamino-6-bromo-1,3,5-triazine.

EXAMPLE 25

CB + N - Methylmercapto - N - methylamine + N,N - Diethylamine = 2 - (N - Methylmercapto - N - methylamino) - 4 - (N,N - diethylamino) - 6 - bromo - 1,3,5-triazine.

EXAMPLE 26

CB + N-Ethylmercapto-N-ethylamine + N,N-Dimethylamine = 2 - (N - Ethylmercapto - N - ethylamino) - 4 - N,N-dimethylamino)-6-bromo-1,3,5-triazine.

EXAMPLE 27

CB + N-Methylmercapto-N-methylamine + N,N,-Di-n - propylamine = 2 - (N - Methylmercapto - N - methylamino) - 4 - (N,N- di - n - propylamino) - 6 - bromo-1,3,5-triazine.

EXAMPLE 28

*Preparation of 2 - (N-Methylmercapto-N-Methylamino)-4-(N,N-Diethylamino)-6-Methoxy-1,3,5-Triazine*

2 - (N - methylmercapto - N - methylamino) - 4 - (N,N-diethylamino-6-chloro-1,3,5-triazine (0.05 mole) prepared as described in Example 4, is dissolved with stirring in absolute methyl alcohol (200 ml.). Powdered sodium hydroxide is added to raise the pH to about 8, and then additional powdered sodium hydroxide (2 g.; 0.05 mol) is added. The mixture is stirred and heated at reflux for about 3 hours. The reaction mixture is poured into cold water (1 liter), and extracted with diethyl ether. The ether solution is dried over anhydrous magnesium sulfate, filtered, and the solvent removed in vacuo to yield 2-(N-methylmercapto-N-methylamino)-4-(N,N-diethylamino)-6-methoxy-1,3,5-triazine.

In a manner similar to the procedure of Example 28, the other compounds within the scope of the present invention wherein $R^5$ is a methoxy can be readily prepared. For example, in the following, Examples 29–33, the reactants required to prepare the indicated named compound by the above procedure, are presented. As in previous examples, cyanuric chloride is designated for brevity as CC. It should also be noted that cyanuric bromide can be utilized in place of cyanuric chloride with equal success.

EXAMPLE 29

CC + Methylmercaptoamine + Methylamine + Methyl alcohol = 2 - Methylmercaptoamino - 4 - methylamino-6-methoxy-1,3,5-triazine.

EXAMPLE 30

CC + N-Methylmercapto-N-methylamine + Isopropylamine + Methyl alcohol = 2-(N-Methylmercapto-N-methylamino) - 4 - isopropylamino - 6 - methoxy - 1,3,5-triazine.

EXAMPLE 31

CC + N-Ethylmercapto-N-methylamine + N,N - Dimethylamine + Methyl alcohol = 2-(N-Ethylmercapto-N - methylamino) - 4 - (N,N - dimethylamino) - 6 - methoxy - 1,3,5-triazine.

EXAMPLE 32

CC + N-Methylmercapto-N-methylamine + n-Butylamine + Methyl alcohol = 2-(N - Methylmercapto - N - methylamino) - 4 - n - butylamino - 6 - methoxy - 1,3,5-triazine.

EXAMPLE 33

CC + Isopropylmercaptoamine + N,N - Dimethylamine + Methyl alcohol = 2-Isopropylmercaptoamino-4-(N,N-dimethylamino)-6-methoxy-1,3,5-triazine.

EXAMPLE 34

*Preparation of 2-(N-Methylmercapto-N-Methylamino)-4-Isopropylamino-6-Methylmercapto-1,3,5-Triazine*

Methyl mercaptan is added to a vigorously stirred solution of sodium hydroxide (2 g.; 0.05 mole) in water (100 ml.). To this mixture is added, 2-(N-methylmercapto-N - methylamino) - 4 - isopropylamino - 6 - chloro - 1,3,5-triazine (0.05 mole), prepared as described in Example 3. The reaction mixture is then heated at reflux with stirring for up to 20 hours. Thereafter the reaction mixture is poured into cold water (1 liter), and extracted with diethyl ether. The ether solution is dried over anhydrous magnesium sulfate, filtered, and the solvent removed in vacuo to yield 2-(N-methylmercapto-N-methylamino) - 4 - isopropylamino - 6 - methylmercapto - 1,3,5-triazine.

The other compounds within the scope of the present invention having the aforesaid structural formula, wherein $R^5$ is methylmercapto can be prepared in the manner described in the previous example. Presented in the following, Examples 35–39, are the reactants required to prepare the indicated named compounds. Cyanuric chloride is designated for brevity as CC. It should also be noted that cyanuric bromide can be utilized in place of cyanuric chloride with equal success.

EXAMPLE 35

CC + N-Methylmercapto-N-methylamine + N,N-Dimethylamine + Methyl mercaptan = 2-(N-Methylmercapto - N - methylamino) - 4 - (N,N - dimethylamino)-6-methylmercapto-1,3,5-triazine.

EXAMPLE 36

CC + N-Ethylmercapto-N-methylamine + N,N-Dimethylamine + Methyl mercaptan = 2-(N-Ethylmercapto - N - methylamino) - 4 - (N,N - dimethylamino)-6-methylmercapto-1,3,5-triazine.

EXAMPLE 37

CC + N-Methylmercapto-N-methylamine + n-Butylamine + Methyl mercaptan = 2-(N-Methylmercapto-N-methylamino) - 4 - n - butylamino - 6 - methylmercapto-1,3,5-triazine.

EXAMPLE 38

CC + Isopropylmercaptoamine + N,N-Dimethylamine + Methyl mercaptan = 2-Isopropylmercaptoamino-4-(N,N - dimethylamino) - 6 - methylmercapto - 1,3,5-triazine.

EXAMPLE 39

CC + N-Methylmercapto-N-methylamine + N,N-Di-n-propylamine + Methyl mercaptan = 2-(N-Methylmercapto - N - methylamino) - 4 - (N,N - di - n - propylamino)-6-methylmercapto-1,3,5-triazine.

EXAMPLE 40

*Preparation of 2-(N-Methylmercapto-N-Methylamino)-4-(N,N-Diethylamino)-6-Amino-1,3,5-Triazine*

The product of Example 4, 2-(N-methylmercapto-N-methylamino) - 4 - (N,N - diethylamino) - 6 - chloro-1,3,5-triazine (0.05 mole) is added to a vigorously stirred solution of saturated alcoholic (methyl alcohol) ammonia (200 ml.). The mixture is heated in a sealed tube at 100° C. for about 8 hours and the reaction mixture evaporated on a steam bath to a volume of 10 ml., dissolved in water, and made basic with a 10% solution of potassium hydroxide. The crude product is extracted with chloroform and the extract dried over potassium carbonate. The solvent is removed by distillation, leaving as a residue 2 - (N - methylmercapto - N - methylamino)-4-(N,N-diethylamino)-6-amino-1,3,5-triazine.

The other compounds of this invention having the aforesaid structural formula, wherein $R^5$ is amino, can be prepared in the manner described in Example 40. Exemplary of their preparation, are the following, Examples 41–44, wherein the reactants required to prepare the indicated named compounds are presented. As in the previous examples, cyanuric chloride is designated for brevity as CC, and cyanuric bromide can be substituted therefor.

EXAMPLE 41

CC + Methylmercaptoamine + Methylamine + Ammonia = 2 - Methylmercapto - 4 - methylamino - 6-amino-1,3,5-triazine.

EXAMPLE 42

CC + N-Ethylmercapto-N-ethylamine + N,N-Dimethylamine + Ammonia = 2 - (N - Ethylmercapto - N-ethylamino) - 4 - (N,N - dimethylamino) - 6 - amino-1,3,5-triazine.

EXAMPLE 43

CC + N-Methylmercapto-N-methylamine + Isopropylamine + Ammonia = 2-(N-Methylmercapto-N-methylamino)-4-isopropylamino-6-amino-1,3,5-triazine.

EXAMPLE 44

CC + Isopropylmercaptoamine + N,N-Diethylamine + Ammonia = 2-Isopropylmercaptoamino-4-(N,N-dimethylamino)-6-amino-1,3,5-triazine.

EXAMPLE 45

*Preparation of 2-(N-Methylmercapto-N-Methylamino)-4-6-Di-(Ethylamino)-1,3,5-Triazine*

The product of Example 1, 2-(N-methylmercapto-N-methylamino)-4,6-dichloro-1,3,5-triazine (0.05 mole), is mixed with ethylamine (200 ml.) and the mixture heated in a sealed tube at about 100° C. for 2 hours. The unreacted ethylamine is removed by distillation, and the residue therefrom is dissolved in water. The aqueous solution is made basic with a 10% solution of potassium hydroxide. The crude product is extracted with chloroform and the extract dried over potassium carbonate. The solvent is removed by distillation, to yield as a residue 2-(N - methylmercapto) - N - methylamino) - 4,6 - di(ethylamino)-1,3,5-triazine.

EXAMPLE 46

*Preparation of 2-(N-Methylmercapto-N-Methylamino)-4-(N,N-Diethylamino) - 6 - Methylamino - 1,3,5-Triazine*

The product of Example 4, (0.05 mole) is mixed with methylamine (100 ml.) and heated in a sealed tube at about 100° C. for 2 hours. The unreacted methylamine is removed by distillation, and the residue therefrom is dissolved in water. The aqueous solution is made basic with a 10% solution of potassium hydroxide. The crude product is extracted with chloroform and the extract dried over potassium carbonate. The solvent is removed by distillation, to yield as a residue 2-(N-methylmercapto-N-methylamino) - 4 - (N,N - diethylamino) - 6 - methylamino-1,3,5-triazine.

In a similar manner the other compounds of the present invention having the aforesaid structural formula, wherein $R^5$ is

wherein $R^2$ and $R^3$ are independently selected from the group consisting of hydrogen and alkyl radicals of 1 to 6 carbon atoms, but not both hydrogen, can be prepared.

In illustration of this preparation, the following examples are presented, wherein the reactants required to prepare the indicated named compounds are given. As in the previous examples, cyanuric chloride is designated as CC, and cyanuric bromide can be substituted therefor.

EXAMPLE 47

CC+N - methylmercapto - N - methylamine+N,N - dimethylamine+methylamine=2 - (N - methylmercapto-N-methylamino) - 4 - (N,N - dimethylamino) - 6 - methylamino - 1,3,5 - triazine.

EXAMPLE 48

CC + N-Methylmercapto-N-methylamine + N,N-Dimethylamine = 2-(N-Methylmercapto-N-methylamino)-4,6-di-(N,N-dimethylamino)-1,3,5-triazine.

EXAMPLE 49

CC + N-n-Propylmercapto-N-n-propylamine + N,N-Dimethylamine = 2-(N-n-propylmercapto-N-n-propylamino)-4,6-di-(N,N-dimethylamino)-1,3,5-triazine.

EXAMPLE 50

CC + N-Methylmercapto-N-methylamine + n-Butylamine + Isopropylamine=2 - (N - Methylmercapto-N-methyamino) - 4 - (n - butylamino) - 6 - isopropylamino-1,3,5-triazine.

EXAMPLE 51

CC + N-Methylmercapto-N-methylamine + sec-Butylamine + N-Methyl-N-ethylamine = 2-(N-Methylmercapto-N-methylamino) - 4 - (sec - butylamino) - 6 - (N-methyl-N-ethylamino)-1,3,5-triazine.

EXAMPLE 52

CC + N-Ethylmercapto-N-ethylamine + N,N-Di-n-propylamine = 2-(N-Ethylmercapto - N - ethylamino)-4,6 - di(N,N - dipropylamino) - 1,3,5 - triazine.

For practical use as pesticides, the compounds of this invention are generally incorporated into pesticidal compositions which comprise an inert carrier and a pesticidally toxic amount of such a compound. Such pesticidal compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, gypsum, calcium carbonate, dolomite, pyrophyllite, pumicite, ground walnut shell, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid pesticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents. A typical emulsifiable concentrate formulation is illustrated in the following example, in which the quantities are in parts by weight.

EXAMPLE 53

| | Percent |
|---|---|
| Product of Example 4 | 25 |
| Aromatic polyethylene glycol ether emulsifier | 5 |
| Xylene | 70 |

The emulsifiable concentrate can be prepared by dissolving the product of Example 4 in the xylene, gentle heating being used if necessary. The emulsifier is then added, and the mixture is stirred until homogeneous. The resulting concentrate can be diluted with water to give the desired concentration of the active compound for application to the site of the pest infestation.

The pesticides of this invention can be applied in any manner recognized by the art. The concentration of the new compounds of this invention in the pesticidal compositions will vary greatly with the type of formulation and the purpose for which it is designed, but generally the pesticidal compositions will comprise from about 0.5 to about 95 percent by weight of the active compounds of this invention. Preferably, the pesticidal compositions will comprise from about 5 to about 75 percent by weight of the active compounds of this invention. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including summer annuals such as pigweed, lamb's-squarters, ragweed, yellow and green foxtail, and crabgrass; winter annuals such as chickweed, wild mustard, shepherd's-purse, and penny-cress; biennials such as wild carrot and great burdock; and perennials such as quackgrass, Johnson grass, Canada thistle, hedge bindweed, Bermuda grass, and sheep sorrel. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of only a few ounces of an active compound per acre may be sufficient for good control of a light infestation of weeds growing under adverse conditions, the application of more than one pound of active compound per acre may be required for good control of a dense infestation of hardy weeds growing under favorable conditions.

The herbicidal toxicity of the new compounds of this invention can be illustrated by any of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of compounds of this invention. Comparable pre-planting or post-emergence tests can also be used.

We claim:
1. A compound of the formula

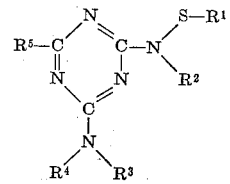

wherein $R^1$ is an alkyl radical of 1 to 4 carbon atoms; $R^2$ and $R^3$ are independently selected from the group consisting of hydrogen and alkyl radicals of 1 to 6 carbon atoms; $R^4$ is an alkyl radical of 1 to 6 carbon atoms; and $R^5$ is selected from the group consisting of chlorine, bromine, methoxy, methylmercapto and

wherein $R^2$ and $R^3$ are as defined above.

2. 2-(N-methylmercapto - N - methylamino)-4-ethylamino-6-chloro-1,3,5-triazine.
3. 2 - (N - methylmercapto-N-methylamino)-4-N,N-diethylamino)-6-chloro-1,3,5-triazine.
4. 2 - methylcarcaptoamino - 4 - ethylamino-6-chloro-1,3,5-triazine.
5. 2-methylcercaptoamino - 4 - (N,N-diethylamino)-6-chloro-1,3,5-triazine.
6. 2 - ethylmercaptoamino - 4 - ethylamino-6-chloro-1,3,5-triazine.
7. 2-(N-methylmercapto - N - methylamino)-4-isopropylamino-6-methylmercapto-1,3,5-triazine.
8. 2-(N-methylmercapto - N - methylamino)-4-isopropylamino-6-methoxy-1,3,5-triazine.

References Cited in the file of this patent

UNITED STATES PATENTS

| 2,211,709 | Zerweck et al. | Aug. 13, 1940 |
| 2,368,451 | D'Alelio | Jan. 30, 1945 |
| 2,513,264 | Holm-Hansen | June 27, 1950 |
| 2,658,893 | Roemer et al. | Nov. 10, 1953 |
| 2,891,855 | Gysin et al. | June 23, 1959 |
| 2,923,614 | Gysin et al. | Feb. 2, 1960 |
| 2,996,505 | Schwarze | Aug. 15, 1961 |

OTHER REFERENCES

Hartough: Jour. of the Am. Chem. Soc. vol. 69 (1947) pages 1355–1358. QD 1 A5.

UNITED STATES PATENT OFFICE
CERTIFICATE OF CORRECTION

Patent No. 3,141,885                          July 21, 1964

Frank Ross et al.

It is hereby certified that error appears in the above numbered patent requiring correction and that the said Letters Patent should read as corrected below.

Column 1, lines 28 to 31, the formula should appear as shown below instead of as in the patent:

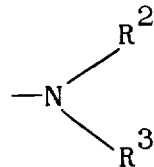

line 43, for "bromide atoms" read -- bromine atoms --; line 54, for "$R^1$-$R^5$" read -- $R^1$-$R^4$ --; line 64, for "$R^2$NHSR" read -- $R^2$NHSR$^1$ --; column 3, line 35, before "same" insert -- the --; column 4, line 4, after "ylamino" insert a closing parenthesis; line 50, before "N,N-" insert a beginning parenthesis; column 6, line 14, for "n-Proplymercaptoamine" read -- n-Propylmercaptoamine --; column 7, line 22, before "N-N-" insert a beginning parenthesis; column 9, line 49, after "methylmercapto" strike out the closing parenthesis; column 12, line 36, after "-4-" insert a beginning parenthesis; same column 12, line 40, for "2-methylcercaptoamino" read -- 2-methylmercaptoamino --.

Signed and sealed this 24th day of November 1964.

(SEAL)
Attest:

ERNEST W. SWIDER                          EDWARD J. BRENNER
Attesting Officer                         Commissioner of Patents